US008892152B2

(12) United States Patent
Razoumov et al.

(10) Patent No.: US 8,892,152 B2
(45) Date of Patent: Nov. 18, 2014

(54) RESOURCE ALLOCATION FOR CHANNELS WITH IMPERFECT FEEDBACK

(75) Inventors: Leonid Razoumov, Riverdale, NY (US); Robert Raymond Miller, II, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 451 days.

(21) Appl. No.: 13/281,484

(22) Filed: Oct. 26, 2011

(65) Prior Publication Data

US 2013/0109428 A1     May 2, 2013

(51) Int. Cl.
*H04B 7/00*     (2006.01)
*H04B 17/00*     (2006.01)
*H04W 52/24*     (2009.01)
*H04W 52/34*     (2009.01)
*H04W 52/32*     (2009.01)
*H04W 52/22*     (2009.01)
*H04W 52/26*     (2009.01)

(52) U.S. Cl.
CPC .......... *H04B 17/0067* (2013.01); *H04W 52/325* (2013.01); *H04W 52/24* (2013.01); *H04B 17/007* (2013.01); *H04W 52/225* (2013.01); *H04W 52/265* (2013.01); *H04W 52/346* (2013.01)

USPC .......... 455/522; 455/69; 455/500; 455/67.11; 455/509; 455/517; 370/310; 370/328; 370/329; 370/338; 370/343

(58) Field of Classification Search
CPC . H04W 52/346; H04W 52/325; H04W 52/24; H04W 52/26; H04W 52/146; H04W 52/343
USPC .......... 455/522, 69, 58, 127.1, 500, 517, 515, 455/445, 422.1, 403, 67.11, 550.1, 561, 455/508, 509, 511, 514, 426.2, 423–425, 455/414.1–414.4; 370/310, 328, 329, 338, 370/343, 350
See application file for complete search history.

(56) References Cited

U.S. PATENT DOCUMENTS

2011/0053631 A1*    3/2011    Bottomley et al. .......... 455/522

* cited by examiner

*Primary Examiner* — Keith Ferguson
(74) *Attorney, Agent, or Firm* — Abel Law Group, LLP

(57) ABSTRACT

A method and apparatus optimizes transmitter power allocations among a plurality of wireless channels that connect to remote units. The optimizing is effected by the remote units sending information to the base stations regarding the quality of the channels. The apparatus modifies the received information to arrive at operating estimates that account for service grades, and through an iterating process that accounts for probability of actual channel qualities relative to the operating estimates of the channel qualities, allocates the transmitter's power to the different channels.

17 Claims, 2 Drawing Sheets

RESOURCE ALLOCATION FOR CHANNELS WITH IMPERFECT FEEDBACK

BACKGROUND

This pertains to communication systems and, more particularly, to allocation by a transmitter of transmission power to a plurality of channels.

One characteristic of current-day mobile communication systems is that a base station provides service to a large number of mobile units that are permitted to travel while communicating. Another characteristic of such communication systems is that the capacities of the individual channels that are used for transmitting to the mobile units vary with time. Yet another characteristic is that the transmission power is limited. The transmitter of a base station is thus faced with a situation where a plurality of channels of different capacities need to serve a plurality of mobile units that expect data flow of respective rates, over respective bandwidths, with respective tolerances to errors, all in an environment where the qualities of the channels are not known with precision.

The qualities of the channels are not known with precision because the best knowledge that the transmitter has is obtained from feedback, such as Channel Quality Indicator (CQI) messages, that is sent by the mobile units. The measurement of the channel quality, the coarse CQI encoding, the transmission of the CQI messages to the base station, and the decoding of those messages all take time, in addition to containing significant quantization errors and, consequently, the best information that a base station has of channel quality is a coarse estimate of past performance. This information is, therefore, of questionable value in fine allocation of transmitter power.

The challenge is to assign transmission power to channels in the most effective manner, taking account of the different performance levels that are required, or acceptable, in an environment where only the aforementioned coarse estimates of the qualities of the channels are known.

The prior art handles this uncertainty in the channel quality knowledge by employing a fade margin, which adds several dBs to the transmit level to insure successful communication in the event the actual channel's conditions are worse than what the CQI messages indicate.

The problem with the prior art approaches is the inability to optimize transmitter/receiver operation to the case at hand when firstly we are dealing with limited radio resources (limited power, limited bandwidth), and secondly the channel is known with a statistical error. Consequently, prior art solutions end up either with wasted power (too big margins) or excessive error-rate if margins are insufficient. In both cases the effective communication rate is less than can be obtained if optimal solution is used.

SUMMARY

An advance in the art is realized with a method and apparatus that optimizes transmitter power allocations among a plurality of channels in an arrangement where a transmitter, such as that of a base station, communicates with remote units over a wireless channel. The optimizing is effected by the remote units sending information to the base stations regarding the quality of channel between the transmitter and the respective remote units, the apparatus that receives this information processes it to obtain operating estimates of the channel qualities, and through a computational procedure that is applied to results of a previous application of the procedure as a means for arriving at a solution (iterating process) accounts for probability of actual channel qualities relative to the operating estimates of the channel qualities, and employs the solution of the iterative process to allocate the transmitter's power to the different channels.

DETAILED DESCRIPTION

Figure 1:
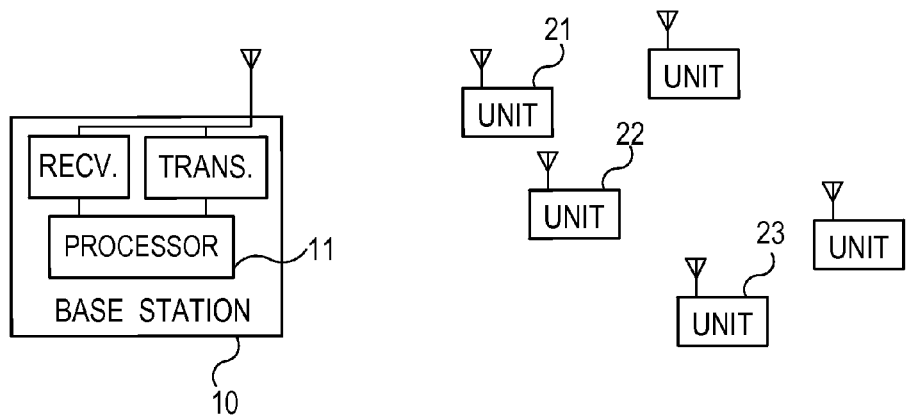
FIG. 1 is a block diagram of apparatus for practicing the principles disclosed herein.

FIG. 1 presents a block diagram of an illustrative arrangement for practicing the principles disclosed herein. Base station 10 includes a transceiver for two-way communication with remote units 21, 22, 23 over a wireless channel. By prearrangement, the information that is communicated by the base station is in accord with a certain level of service; meaning that the error rate is below a predetermined level. To accomplish the prearranged level of service, the transmitter adjusts its transmission power and other transmission parameters relative to each of the remote units (such as the modulation level) based on the quality of the respective channels to the remote units. The qualities of those channels are derived from information that is fed back by the remote units to the base station, e.g., the aforementioned CQI messages that are sent periodically (perhaps at a 1 KHz rate), and optionally also based on adjustments to that fed back information.

Regarding the CQI messages, it may be worth repeating that the estimates of the channel qualities that the remote units provide are the channel qualities as they are perceived by the remote units, and that those perceived channel qualities are deficient on two counts. First, the process of creating and communicating them to base station 10 requires time and, therefore, they are necessarily delayed; i.e., they are somewhat out of date. Second, the process of measuring the channel quality is not accurate, and the encoding of the measured channel quality adds significant quantization noise.

Additionally, there are typically policy reasons for adjusting the received value. For example, if it is desired to guarantee to a particular remote unit a lower error rate without adversely affecting the throughput rate, the base station forces the assumption that the channel quality is poorer than it is perceived, so that more power is allocated to that remote unit. This is accomplished by subtracting a preselected number of dBs from the channel quality that was perceived by the remote unit and sent to the base station, yielding what is referred to herein as "operational estimates."

In the mathematical treatment that follows, the true channel quality from transmitter 10 to a remote unit n is designated by $g_n$, while the perceived (or estimated) channel quality that is sent by the remote unit n and which is then modified to form the operational estimate is designated by $\gamma_n$.

In an environment, such as in the FIG. 1 arrangement, where a plurality of distinct channels are employed to transmit information to respective remote units, and where noise in those channels is Gaussian, according to Shannon's basic formula the capacity of a channel n of bandwidth $B_n$ is $$C_n = B_n \ln\left(1 + \left(\frac{S}{N}\right)_n\right),$$

where $\left(\frac{S}{N}\right)_n$ is the signal to noise ratio of channel n. We observe that the signal to noise ratio can be expressed by $g_n u_n$, where $$g_n = \frac{|h|^2 P_{total}}{N_0 + I_0}$$

is channel quality, $N_0$ and $I_0$ are thermal noise and interference, respectively, h is channel gain, and $P_{total}$ is the total power used by the transmitting station, and where $u_n \geq 0$ is the fraction of power allocated to channel n $$\left(i.e., u_n = P_n / P_{total} \geq 0, \text{ and } \sum_{n=1}^{N} u_n = 1\right).$$

This Observation Leads to $$C_n = B_n \ln(1 + g_n u_n), \quad (1)$$

but as indicated above, a transmitter does not know the true channel quality, $g_n$, so it must make do with the perceived (or estimated) channel quality, $\gamma_n$, when determining channel capacity; i.e., equation (1) converts to:

$$C_n = B_n \ln(1 + \gamma_n u_n). \quad (2)$$

We consider a transmission environment where, if the actual channel quality is lower than the perceived quality, i.e., $g_n < \gamma_n$ then the transmission will fail (contributing 0 to the overall channel capacity), and if the actual channel quality is higher than the perceived quality, i.e., $g_n < \gamma_n$ then the transmitter is unnecessarily generous in its allocation of power.

Based on the above, it can be said that the overall sum capacity can be expressed by:

$$C = \sum_{n=1}^{N} B_n \ln(1 + \gamma_n u_n) \Theta(g_n - \gamma_n) \quad (3)$$

where $$\Theta(g_n - \gamma_n) = \begin{cases} 1 & \text{if } (g_n > \gamma_n) \\ 0 & \text{if } (g_n < \gamma_n) \end{cases}. \quad (4)$$

The value of $\Theta(0)$ is not very critical because it is merely a point on a continuum; illustratively, $\Theta(0)$ may be set to ½.

The expected value of the sum-rate capacity, which is sensitive to the expected actual channel quality given the perceived channel quality, can be expressed by $$E_g[C(\vec{\gamma})] = \int p(\vec{g}|\vec{\gamma}) \left(\sum_{n=1}^{N} B_n \ln(1 + \gamma_n u_n) \Theta(g_n - \gamma_n)\right) d^N \vec{g} \quad (5)$$

where $p(\vec{g}|\vec{\gamma})$ is the probability distribution of the actual channel qualities vector $\vec{g}$, given the perceived channel qualities vector, $\vec{\gamma}$. Equation (5) can be rewritten as $$E[C(\vec{\gamma})] = \sum_{n=1}^{N} B_n \ln(1 + \gamma_n u_n) \int \Theta(g_n > \gamma_n) dg_n \quad (6)$$

or $$E[C(\vec{\gamma})] = \sum_{n=1}^{N} s_n(\gamma) \ln(1 + \gamma_n u_n), \quad (7)$$

where $$s_n(\vec{\gamma}) = B_n \int p(g_n|\gamma_n) \Theta(g_n - \gamma_n) dg_n, \quad (8)$$

or $$s_n(\vec{\gamma}) = B_n Pr\{(g_n \geq \gamma_n)|\gamma_n\} = B_n w_n. \quad (9)$$

The term $w_n$ thus represents the probability that channel n satisfies the requested grade of service (since it corresponds to the probability of $g_n \geq \gamma_n$).

It is a common practice by base stations to have long-term statistical information about channel qualities that are needed for different grades of service. From such information the probability distribution of $g_n$ for various grades of service is derived. Further, the requested, or needed, grade of service of a particular remote unit is known either from the identity of the remote unit (e.g., voice device or a data device) or from observing the nature of the data outputted by the remote unit. Consequently, it is assumed herein that that base station 10 possesses the probability distribution of $g_n$ for various grades of service and that, therefore, the probability $g_n \geq \gamma_n$ for any given $\gamma_n$ can be easily computed in a conventional manner from the probability distribution.

Equation (3) includes the two constraints:

$$\sum_{n=1}^{N} u_n = 1,$$

and $u_n \geq 0$. We can remove some of the constraints (so that we have to solve a function that has only one constraint) by replacing the variable $u_n$ by the variable $x_n^2$ ($u_n = x_n^2$), thus changing equation (7) to $$E[C(\vec{\gamma})] = \sum_{n=1}^{N} s_n(\gamma) \ln(1 + \gamma_n x_n^2). \quad (10)$$

We seek is to maximize the overall channel capacity that a transmitter can realize, and that means that we seek to maximize equation (10), subject to the single constraint $$\sum_{n=1}^{N} x_n^2 = 1. \quad (11)$$

Such a maximum exists only when the contour of the equation (10) function tangentially meets the constraint function of equation (11), which means that within a multiplicative constant $\lambda$ the gradient of the equation (10) function—which may be either positive or negative—must be equal to the gradient of the equation (11) function. The constant $\lambda$ is known as the Lagrange multiplier. This formulation reduces the constrained equation (10) to the unconstrained equation $$J(\vec{x}, \lambda|\vec{\gamma}) = \lambda + \sum_{n=1}^{N} [s_n(\gamma) \ln(1 + \gamma_n x_n^2) - \lambda x_n^2]. \quad (12)$$

As is well known in the art, a maximum (or minimum) can be found by setting to zero the derivative of the function relative to the independent variables; i.e., $$\frac{d\vec{J}}{d\lambda} = 0 = 1 - \sum_{n=1}^{N} x_n^2 \qquad (13)$$

and $$\frac{d\vec{J}}{dx_k} = 0 = 2x_k \left[ \frac{s_n(\gamma)\gamma_n}{(1+\gamma_n x_n^2)} - \lambda \right] \text{ for } n=1, 2, \ldots N. \qquad (14)$$

Equation (13) merely reflects the constraint function of equation (11), while equation (14) has the two solutions $$\frac{s_n(\gamma)\gamma_n}{(1+\gamma_n x_n^2)} - \lambda = 0, \text{ and } x_k = 0 \text{ for } n=1, 2, \ldots N. \qquad (15)$$

The first solution can yield a negative $x_n^2$, which has no physical meaning in our context because it results in an imaginary power fraction $x_n^2$, in which case the second solution is the proper one. Hence, the general solution—effectively combining the employed solutions of equation (15)—is $$\frac{u_n}{s_n(\gamma)} = \frac{x_n^2}{s_n(\gamma)} = \max\left(0, \frac{1}{\lambda} - \frac{1}{s_n(\gamma)\gamma_m}\right), \text{ or} \qquad (16)$$

$$u_n = \max\left(0, \frac{1}{\lambda} - \frac{1}{s_n(\gamma)\gamma_m}\right) s_n(\gamma)$$

Figure 2:
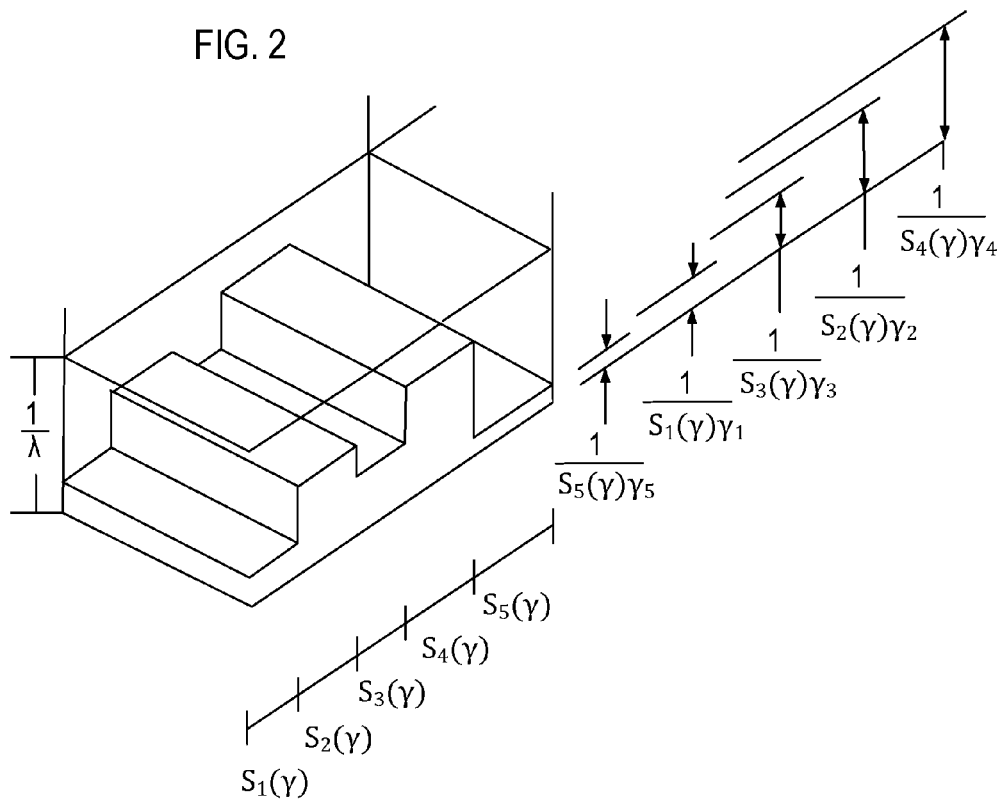
FIG. 2 illustrates the water-filling paradigm for optimizing transmitter power allocation disclosed herein.

The equation (16) solution has a water-filing interpretation. To visualize this interpretation, imagine a pool of width 1, and steps along its length as depicted in FIG. 2; that is, as one travels the length of the pool, one would observe that the floor has steps (up and/or down). If the steps have tread depths $s_1(\gamma), s_2(\gamma), \ldots, s_N(\gamma)$, and step heights from the bottom of the pool $$\frac{1}{s_1(\gamma)\gamma_1}, \frac{1}{s_2(\gamma)\gamma_2}, \ldots, \frac{1}{s_N(\gamma)\gamma_N},$$

as shown in FIG. 2, and if one fills the pool to water level $$\frac{1}{\lambda},$$

then the total volume of water above step n is $$V_n = \max\left(0, \frac{1}{\lambda} - \frac{1}{s_n(\gamma)\gamma_n}\right) s_n(\gamma). \qquad (17)$$

That is, a step n that is underwater has a $$V_n = \left(\frac{1}{\lambda} - \frac{1}{s_n(\gamma)\gamma_n}\right) s_n(\gamma)$$

volume above it, whereas a step n that sticks up above water has a $V_n=0$ water volume above it.

Equation (17) looks just like equation (16), with the volume $V_n$ corresponding to $u_n$ which, as indicated above, is the fraction of transmitter power that is assigned to channel n. The total volume height is $$V = \sum_{n=1}^{N} V_n = \sum_{n=1}^{N} \max\left(0, \frac{1}{\lambda} - \frac{1}{\gamma_n s_n(\gamma)}\right) s_n(\gamma) \qquad (18)$$

and that corresponds precisely to the sum of the fractional powers that are assigned to the N channels; i.e., $$\sum_{n=1}^{N} u_n = \sum_{n=1}^{N} \max\left(0, \frac{1}{\lambda} - \frac{1}{\gamma_n s_n(\gamma)}\right) s_n(\gamma).$$

The challenge is to find a value of $\lambda$ such that the sum of the fractional powers is equal to 1; i.e., $$\sum_{n=1}^{N} u_n(\lambda) = 1 = \sum_{n=1}^{N} \max\left(0, \frac{1}{\lambda} - \frac{1}{\gamma_n s_n(\gamma)}\right) s_n(\gamma), \qquad (19)$$

where, $u_n(\lambda) = \max\left(0, \frac{1}{\lambda} - \frac{1}{\gamma_n s_n(\gamma)}\right) s_n(\gamma)$ to is the fraction of transmitter power that ought to be assigned to channel n. This challenge is addressed by the following method, executed by processor 11 within base station 10, which process is depicted by the flowchart of FIG. 3.

1. Obtain the perceived channel quality measures and modify them per information that is available to the base station to form the operational values $\gamma_n$, n=1, 2, ..., N (step 101 in FIG. 3);
2. Obtain $s_n(\gamma)$, n=1, 2, ..., N, or, if necessary, compute these values from the probability distributions that are known to the base station (step 102 in FIG. 3);
3. Choose a value for $$\frac{1}{\lambda}$$

(step 103 in FIG. 3);
4. Evaluate $$Z = \left| 1 - \sum_{n=1}^{N} \max\left(0, \frac{1}{\lambda} - \frac{1}{\gamma_n s_n(\gamma)}\right) s_n(\gamma) \right| \qquad (20)$$

Figure 3:
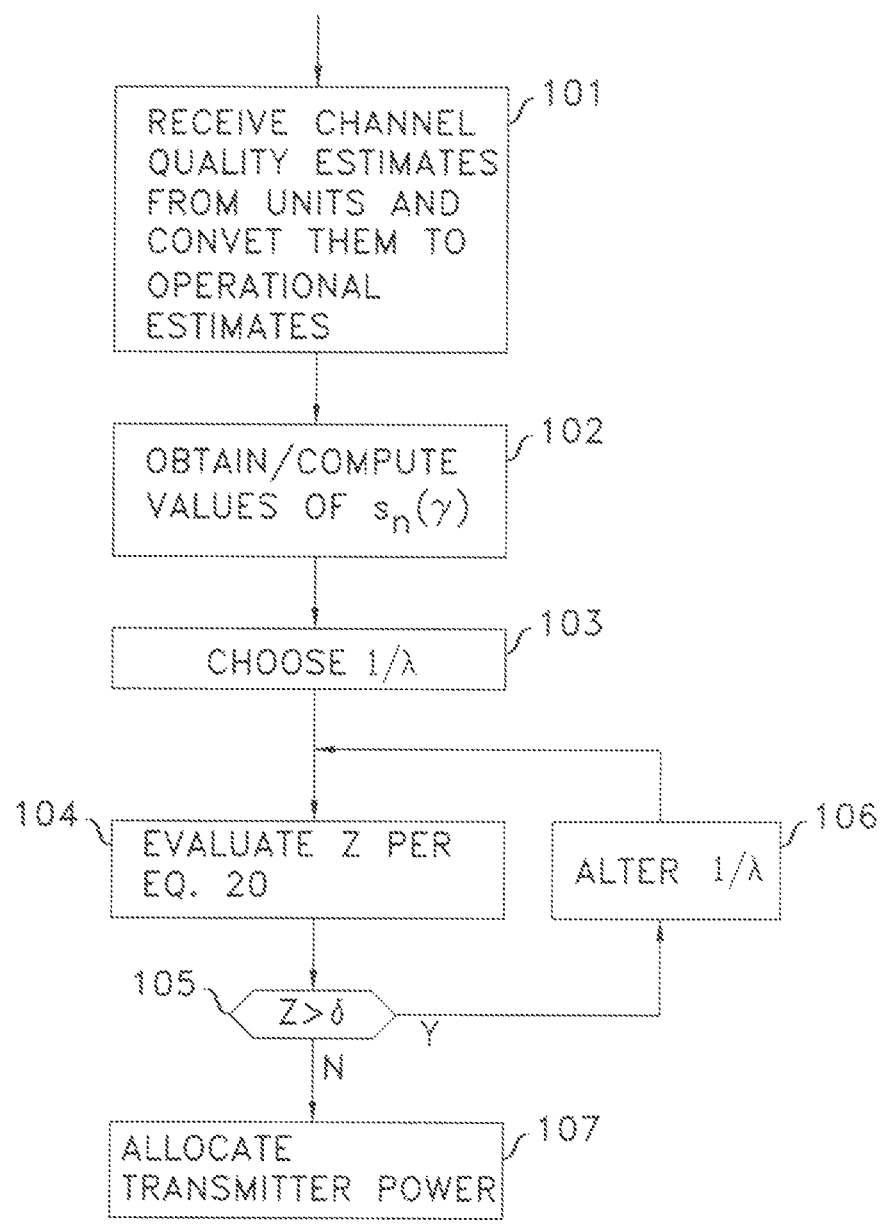
FIG. 3 presents a flow diagram of the method disclosed herein.

(step 104 in *FIG. 3*);

5. If $|Z|>\delta$, where $\delta$ is a preselected constant, then alter $\lambda$ in the direction of reducing $\delta$, and return to the step of evaluating (step 106 in FIG. 3). Otherwise assign the fraction $u_n$ of the base station's transmitter power pursuant to equation (16) (step 107 in FIG. 3).

The above process is repeated pursuant to a preselected algorithm. For example, the process may be repeated each time a new set of perceived channel quality values becomes available. It can also be performed less often, and perhaps not in synchronism with the arriving perceived channel quality values. For example, at some selected repetition rate chosen by (or for) processor 11, all arrived perceived channel quality values that have not previously been considered are averaged, and the averages used to execute the above-disclosed method to thereby assign transmitter power to the different channels that service the different remote units.

The invention claimed is:

1. A method executed in a base station comprising the steps of: receiving a channel quality estimate from each of a plurality of remote units that communicate with said base station over respective channels of a wireless communication medium; executing a process that modifies 0≤m≤n of the received channel quality estimates to arrive at modified channel quality estimates and that takes into account probability of actual channel qualities relative to said modified channel quality estimates, to develop values that specify fractions of available power that a transmitter of said base station might devote to each of the channels, where m and n are integers; and allocating said available power of said transmitter in accordance with the developed values that specify the fractions.

2. The method of claim 1 wherein said process is iterative.

3. The method of claim 1 the received channel quality estimates are modified according to a service policy of the base station.

4. The method of claim 1 where said receiving is regularly repeated.

5. The method of claim 1 where said steps of executing and allocating are repeated pursuant to a preselected algorithm.

6. The method of claim 1 where said processing creates the modified channel quality estimates based on information that is available to said base station.

7. The method of claim 6 where said information pertains to grades of service specified for said remote units.

8. A method executed in a base station comprising the steps of:
receiving a channel quality estimate from each of a plurality of remote units that communicate with said base station over respective channels of a wireless communication medium;
executing a process that takes into account probability of actual channel qualities relative to said received channel quality estimates, or relative to said received channel quality estimates that are modified, to develop values that specify fractions of available power that a transmitter of said base station might devote to each of the channels; and
allocating said available power of said transmitter in accordance with the developed values that specify the fractions,
where said process comprises the steps of:
modifying 0≤m≤n of the received channel quality estimates, based on information available to said base station, to result in operational estimates $\gamma_n$ where n=1, 2, ... N designates the channels;
choosing an initial value for parameter $\lambda$;
evaluating $$1 - \sum_{n=1}^{N} \max\left(0, \frac{1}{\lambda} - \frac{1}{\gamma_n s_n(\gamma)}\right) s_n(\gamma),$$

where $s_n(\gamma) = B_n w_n$, $B_n$ is the bandwidth of channel n, and $w_n$ is probability that channel n satisfies a specified grade of service;
if magnitude of $$\sum_{n=1}^{N} \max\left(0, \frac{1}{\lambda} - \frac{1}{\gamma_n s_n(\gamma)}\right) s_n(\gamma) - 1$$

is greater than a preselected constant $\delta$, modifying parameter $\lambda$, and returning to said step of evaluating, and if magnitude of $$\sum_{n=1}^{N} \max\left(0, \frac{1}{\lambda} - \frac{1}{\gamma_n s_n(\gamma)}\right) s_n(\gamma) - 1$$

is not greater than said preselected constant $\delta$, proceeding with said step of allocating, with fractions $$u_n = \max\left(0, \frac{1}{\lambda} - \frac{1}{\gamma_n s_n(\gamma)}\right) s_n(\gamma),$$

n=1, 2, ... N, being the values of available base station transmitter power that said step of allocating allocates to channels n.

9. The method of claim 8 where said $w_n$ is derived from historical data that are based on performance with different channel qualities.

10. An arrangement comprising:
a base station including a processor that includes a memory with a stored program, the processor coupled to receive a channel quality estimate from each of a plurality of remote units that communicate with said base station over respective channels of a wireless communication medium; the processor is configured to execute, using the stored program, a process that modifies 0≤m≤n of the received channel quality estimates to arrive at modified channel quality estimates and the process takes into account probability of actual channel qualities relative to said modified channel quality estimates, to develop values that specify fractions of power that a transmitter of said base station might devote to each of the channels, where m and n are integers; and wherein said base station allocates said power of said transmitter in accordance with the developed values.

11. The arrangement of claim 10 where receipt of the channel quality estimate from each of the plurality of remote units is regularly repeated.

12. The arrangement of claim 10 wherein execution of the process and allocation of said power are repeated pursuant to a preselected algorithm.

13. The arrangement of claim 10 where the modified channel quality estimates are created based on information that is available to said base station.

14. The arrangement of claim 13 where said information pertains to grades of service specified for said remote units.

15. The arrangement of claim 10 where said process comprises:
modifying the received channel quality estimates, based on information available to said base station, to result in operational estimates $\gamma_n$ where n=1, 2, ... N designates the channels;
choosing an initial value for parameter $\lambda$;
evaluating $$1 - \sum_{n=1}^{N} \max\left(0, \frac{1}{\lambda} - \frac{1}{\gamma_n s_n(\gamma)}\right) s_n(\gamma),$$

where $s_n(\gamma) = B_n w_n$, $B_n$ is the bandwidth of channel n, and $w_n$ is probability that channel n satisfies a specified grade of service;
if magnitude of $$\sum_{n=1}^{N} \max\left(0, \frac{1}{\lambda} - \frac{1}{\gamma_n s_n(\gamma)}\right) s_n(\gamma) - 1$$

is greater than a preselected constant $\delta$, modifying parameter $\lambda$, and returning to said step of evaluating, and if magnitude of $$\sum_{n=1}^{N} \max\left(0, \frac{1}{\lambda} - \frac{1}{\gamma_n s_n(\gamma)}\right) s_n(\gamma) - 1$$

is not greater than said preselected constant δ, proceeding with said step of allocating, with fractions $$u_n = \max\left(0, \frac{1}{\lambda} - \frac{1}{\gamma_n s_n(\gamma)}\right) s_n(\gamma),$$

n=1, 2, . . . N, being the values of available base station transmitter power that said step of allocating allocates to channels n.

16. The arrangement of claim 15 where said $w_n$ is derived from historical data that are based on performance with different channel qualities.

17. The arrangement of claim 10 further comprising said transmitter, and a receiver for receiving said channel quality estimate from each of the plurality of remote units.

* * * * *